(No Model.)  3 Sheets—Sheet 1.

T. GREASON.
FISHING REEL.

No. 477,754. Patented June 28, 1892.

WITNESSES:
Geo. B. Adams
John G. Tinsdale

INVENTOR:
Thomas Greason,
BY Fred. C. Fraentzel, ATT'Y.

(No Model.) 3 Sheets—Sheet 2.

T. GREASON.
FISHING REEL.

No. 477,754. Patented June 28, 1892.

WITNESSES:
Geo. B. Adams

INVENTOR:
Thomas Greason,
BY Fred C. Fraentzel, ATT'Y.

(No Model.) 3 Sheets—Sheet 3.

T. GREASON.
FISHING REEL.

No. 477,754. Patented June 28, 1892.

WITNESSES:
Wm. H. Canfield Jr.
B. Mortimer Truddell

INVENTOR:
Thomas Greason,
BY Fred C. Fraentzel, ATT'Y.

UNITED STATES PATENT OFFICE.

THOMAS GREASON, OF NEWARK, NEW JERSEY.

FISHING-REEL.

SPECIFICATION forming part of Letters Patent No. 477,754, dated June 28, 1892.

Application filed August 5, 1891. Serial No. 401,762. (No model.)

*To all whom it may concern:*

Be it known that I, THOMAS GREASON, a citizen of the United States, residing at Newark, in the county of Essex and State of New Jersey, have invented certain new and useful Improvements in Fishing-Reels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in fishing-reels, as will be hereinafter fully described; and it consists of certain arrangements and combinations of parts to be finally pointed out in the clauses of the claim, and the primary object of the invention is to provide a reel having a line-guide which is of a very simple construction and which can be readily manipulated, easily guiding the line when winding it up upon the reel, but which can be disconnected and thrown out of gear while casting the line.

Figure 1:
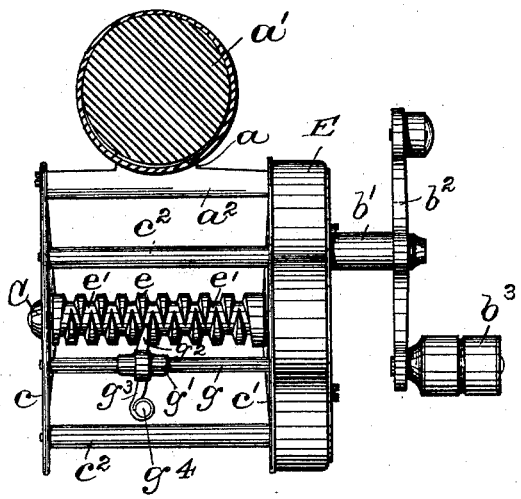
Figure 2:
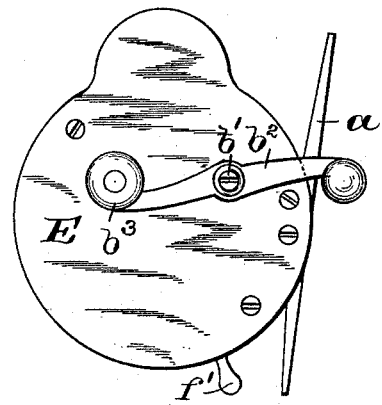
Figure 4:
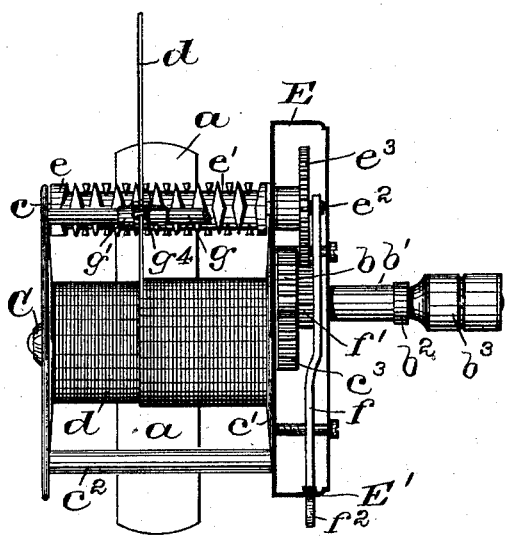
Figure 3:
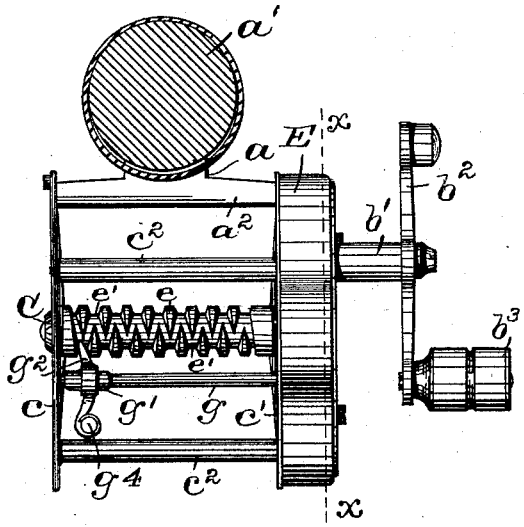
Figures 5, 6:
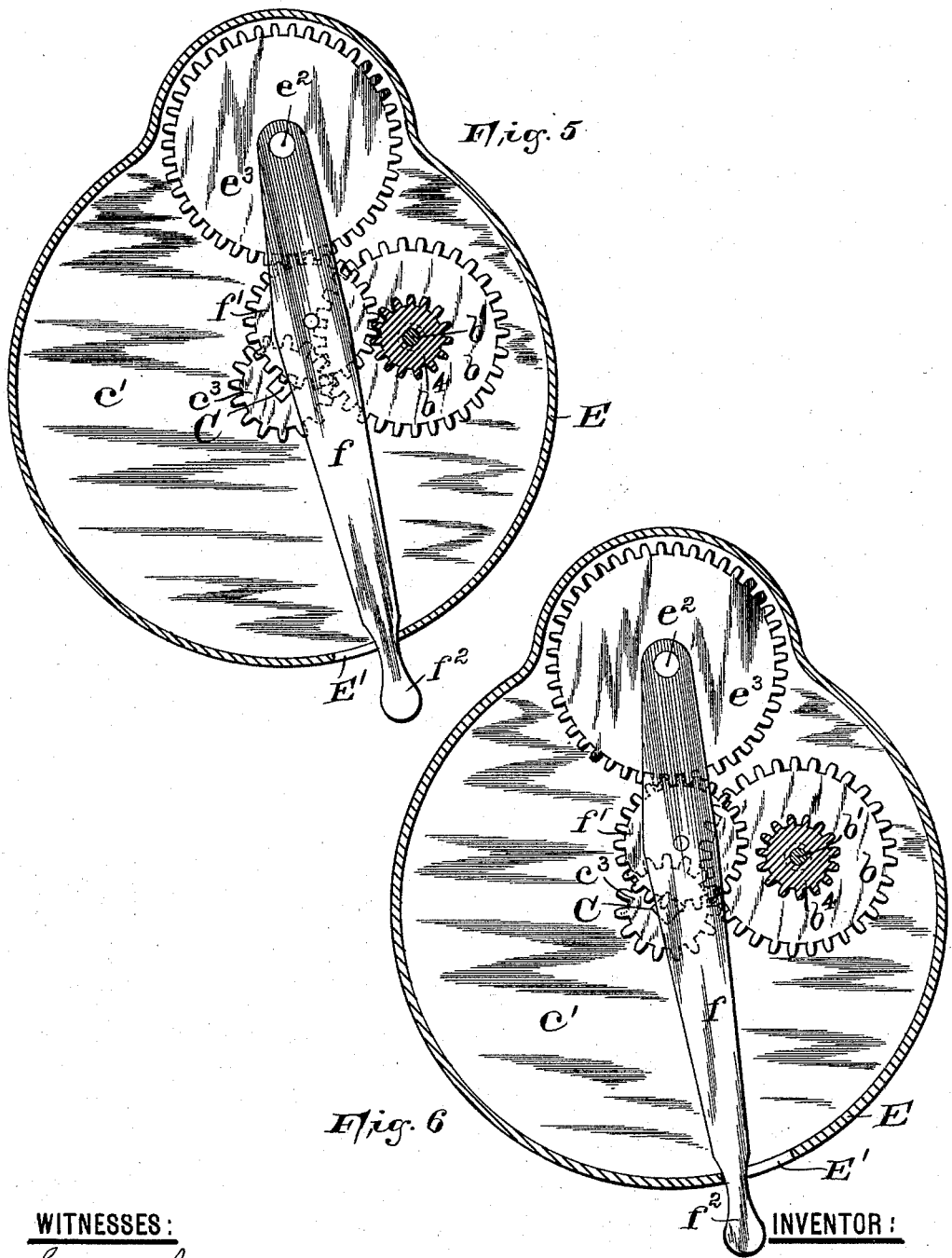
Figure 7:
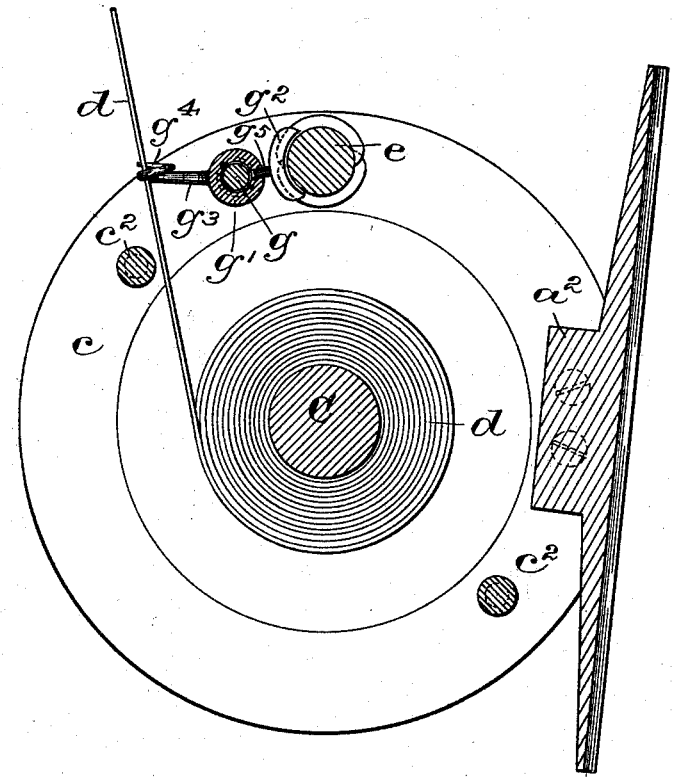

In the two sheets of drawings herewith accompanying, in which are employed similar letters of reference to indicate corresponding parts in each of the several views, Figure 1 is a top view of a fishing-reel embodying my invention, clearly illustrating the arrangement of a cylinder in which are cut reverse threads or grooves to produce a uniform reciprocating rectilinear motion of a follower serving to properly guide the line in winding up. Fig. 2 is an end view of the reel. Fig. 3 is a view similar to that shown in Fig. 1, with the line-guide in the act of being reversed to more clearly illustrate the manner of how said follower is made to traverse the cylinder from end to end. Fig. 4 is a side view of my improved reel, with the casing containing the gear-operated mechanism represented in vertical section. Figs. 5 and 6 are sections taken on line $x$ in Fig. 3, illustrating the arrangement of the gear mechanism and showing a lever provided with a pinion in its engagement and disengagement, respectively, with a gear operated by means of the crank for operating the line-guide and throwing the same out of operation. Fig. 7 is an enlarged vertical section of the reel and the line-guide and its follower.

In the drawings, $a$ is the plate by means of which the reel is secured to the rod $a'$.

C is the journal of the reel, upon which is wound the line $d$. Said journal is secured in the oppositely-placed plates $c$ and $c'$, firmly held together by the connecting-rods $c^2$ and a bar $a^2$, on which the plate $a$ is arranged in the usual manner. Upon the outer side of the plates $c'$ is secured in any desirable manner a casing E, in which is arranged the gear-operating mechanism. As will be noticed more especially from Figs. 5 and 6, said mechanism consists of a gear $c^3$, arranged upon the end of the journal C, which projects through the plate $c'$. Said gear meshes with a second gear $b$, attached to a shaft $b'$, on the opposite end of which is a crank $b^2$, provided with a handle $b^3$. This arrangement of gearing is for operating the reel, and, as will be evident, may be differently arranged, or a multiple gear may be substituted therefor. Between said plates $c$ and $c'$ is journaled a cylinder $e$, which is provided with reverse threads or grooves $e'$, and upon the projecting end $e^2$ of said cylinder, within the casing E, is fastened a suitable gear-wheel $e^3$, through the center of which the end $e^2$ of the cylinder extends. Upon this end is a pivoted lever or handle $f$, provided with a pinion $f'$, which at all times meshes with the gear-wheel $e^3$ and can be thrown into and out of gear with a pinion $b^4$, operated by the shaft $b'$. The lever $f$ extends down through a slot or opening E', and by means of the free end $f^2$ of the lever said gear or pinion $f'$ can be thrown into mesh or out of mesh with the pinion $b^4$, as will be clearly understood from Figs. 5 and 6.

Between the plates $c$ and $c'$ I have arranged the rod $g$, upon which slides a sleeve $g'$, provided with oppositely-projecting arms $g^2$ and $g^3$. This constitutes the follower or line-guide, the arm $g^2$, which is pivotally secured to the sleeve $g'$, extending into the reverse threads or grooves $e'$, and the arm $g^3$ is provided with a loop or eye $g^4$, through which the line passes, as clearly shown in Fig. 4. Said arm $g^2$ is pivotally secured to the sleeve $g'$ by means of a pin $g^5$, which is fast on said arm $g^2$ and extends into a hole in said sleeve, serving as a bearing therefor, as will be clearly seen from said Fig. 7.

The operation of the device is as follows: Suppose the line has been cast and it is desired to wind the same upon the reel. The lever $f$ is pushed over toward the right, as indicated in Fig. 5, thereby causing, while the gear-wheel $b$ by means of the intermediately-arranged gearing operates the shaft C and the reel, the pinion or gear $f'$ to rotate by means of the pinion $b^4$ on the same shaft with the gear $b$, and consequently operating the gear $e^3$, connected with the cylinder $e$. Said cylinder is thus caused to revolve, thereby producing a uniform reciprocating rectilinear motion of the sleeve $g'$ on the rod $g$, whereby the point of the arm $g^2$, which projects into the groove $e'$, is caused to traverse the cylinder from end to end. Of course the loop or eye on the arm $g^4$ travels in the same direction and at the same speed, causing the line to be guided properly and to be wound side by side upon the reel, as will be evident. In casting the line said lever $f$ is pushed to the left, which throws the gear $f'$ out of mesh with the pinion $b^4$, and as the result the cylinder $e$ does not operate and prevents any undue friction which would be objectionable to the unwinding of the line from the reel. When the line has been cast and the momentum of the reel ceases, it often happens in many reels that the resistance offered by the displayed line causes the reel to partly rotate in an opposite direction, whereby the line winds itself in this direction upon the reel and very often causes a serious entanglement. This objection is successfully overcome in the construction of my improved reel by throwing the gear $f'$ into mesh with the pinion $b^4$ when the line has been sufficiently cast, the extra amount of work necessary to be suddenly performed by the rotation of the cylinder $e$ and the intermediate gear preventing the backward turning of the reel, as will be understood.

Of course it will be evident that modifications may be made without departing from the scope of my invention, and the reel may be made of any kind of material, the metal aluminum, owing to its light weight, being preferred. The cylinder $e$ may also be surrounded by a suitable cover, if desirable.

Having thus described my invention, what I claim is—

1. In a fishing-reel, the combination, with the reel and its intermediately-arranged operating mechanism, of a line-guide consisting of a cylinder $e$, provided with double-crossed threads or grooves, and a follower $g'$, provided with arms $g^2$ and $g^3$, said arm $g^3$ having a loop or eye for the line, and said arm $g^2$ being pivoted to said follower, and the point thereof being adapted to move backward and forward on a rod $g$, all of said parts—viz., the reel, cylinder $e$, and rod $g$—being arranged between the same plates $c$ and $c'$, substantially as and for the purposes set forth.

2. In a fishing-reel, in combination, a case E, provided with gears for operating the reel, a shaft $b'$, projecting into said case, and means for operating the same, a gear $b^4$ on said shaft, a pivoted lever $f$, provided with a gear $f'$ to be thrown into or out of engagement with said gear $b^4$, and a line-guide consisting of a cylinder $e$, provided with double-crossed threads, a follower $g'$, provided with an arm $g^2$, pivoted thereto, the free end of which projects between said crossed threads, adapted to move backward or forward on a rod $g$, and an arm $g^3$ on said follower, having a loop or eye for the line, all of said parts—viz., the reel, cylinder $e$, and rod $g$—being arranged between the plates $c$ and $c'$, substantially as and for the purposes set forth.

In testimony that I claim the invention set forth above I have hereunto set my hand this 30th day of July, 1891.

THOMAS GREASON.

Witnesses:
ARTHUR CRESSE,
FREDK C. FRAENTZEL.